(12) United States Patent
Saurat et al.

(10) Patent No.: US 12,508,293 B2
(45) Date of Patent: Dec. 30, 2025

(54) **EXTRACT OF *SILYBUM MARIANUM* (L.) GAERTN. AKENES FOR PROMOTING HAIR GROWTH**

(71) Applicant: PIERRE FABRE DERMO-COSMETIQUE, Boulogne-Billancourt (FR)

(72) Inventors: Jean-Hilaire Saurat, Geneva (CH); Daniel Bacqueville, Toulouse (FR); Hélène Duplan, Auzeville Tolosan (FR)

(73) Assignee: PIERRE FABRE DERMO-COSMETIQUE, Boulogne-Billancourt (FR)

( * ) Notice: Subject to any disclaimer, the term of this patent is extended or adjusted under 35 U.S.C. 154(b) by 999 days.

(21) Appl. No.: 17/632,941

(22) PCT Filed: Aug. 6, 2020

(86) PCT No.: PCT/EP2020/072146
§ 371 (c)(1),
(2) Date: Feb. 4, 2022

(87) PCT Pub. No.: WO2021/023820
PCT Pub. Date: Feb. 11, 2021

(65) Prior Publication Data
US 2022/0331387 A1    Oct. 20, 2022

(30) Foreign Application Priority Data
Aug. 6, 2019   (FR) ...................... 1909012

(51) Int. Cl.
*A61K 36/28*   (2006.01)
*A61K 9/00*    (2006.01)
*A61K 35/16*   (2015.01)
*A61K 35/19*   (2015.01)
*A61K 35/36*   (2015.01)
*A61P 17/14*   (2006.01)

(52) U.S. Cl.
CPC ............ *A61K 36/28* (2013.01); *A61K 9/0014* (2013.01); *A61K 35/16* (2013.01); *A61K 35/19* (2013.01); *A61K 35/36* (2013.01); *A61P 17/14* (2018.01)

(58) Field of Classification Search
CPC .................. A61K 35/36; A61K 36/28
See application file for complete search history.

(56) References Cited

U.S. PATENT DOCUMENTS 5,466,694 A    11/1995  Terranova et al.
2021/0069273 A1  3/2021  Saurat et al.

FOREIGN PATENT DOCUMENTS

| DE | 43 23 614 A1 | 1/1995 |
|---|---|---|
| DE | 10 2009 045 981 A1 | 8/2010 |
| EP | 0 522 964 A1 | 1/1993 |
| FR | 2 809 008 A1 | 11/2001 |
| FR | 3 075 037 A1 | 6/2019 |
| WO | WO 98/33497 A1 | 8/1998 |
| WO | WO 2018/002338 A1 | 1/2018 |

OTHER PUBLICATIONS

Pendry et al. ("Silymarin content in Silybum marianum extracts as a biomarker for the quality of commercial tinctures," Journal of Herbal Medicine 10:31-36, 2017).*
Bradford, "A Rapid and Sensitive Method for the Quantitation of Microgram Quantities of Protein Utilizing the Principle of Protein-Dye Binding," Analytical Biochemistry, vol. 72, 1976, pp. 248-254, 7 pages total.
Cheon et al., "Flavonoid Silibinin Increases Hair-Inductive Property Via Akt and Wnt/β-Catenin Signaling Activation in 3-Dimensional-Spheroid Cultured Human Dermal Papilla Cells," Journal of Microbiology and Biotechnology, vol. 29, No. 2, 2019, pp. 321-329, 9 pages total.
Gu et al., "Keratin Expression Provides Novel Insight into the Morphogenesis and Function of the Companion Layer in Hair Follicles," Journal of Investigative Dermatology, vol. 127, 2007, pp. 1061-1073, 13 pages total.
Johnstone, "Hypertrichosis and Increased Pigmentation of Eyelashes and Adjacent Hair in the Region of the Ipsilateral Eyelids of Patients Treated With Unilateral Topical Latanoprost," American Journal of Ophthalmology, vol. 124, No. 4, 1997, pp. 544-547, 4 pages total.
Kuki et al., "Identification of Silymarin Constituents: An Improved HPLC-MS Method," Chromatographia, vol. 75, 2012, pp. 175-180, 6 pages total.
Mesler et al., "Hair Follicle Terminal Differentiation Is Orchestrated by Distinct Early and Late Matrix Progenitors," Cell Reports, vol. 19, 2017, pp. 809-821, 14 pages total.
Piérard et al., "Cyanoacrylate Skin Surface Stripping and the 3S-Biokit Advent in Tropical Dermatology: A Look from Liège," The Scientific World Journal, 2014, pp. 1-13, 14 pages total.
Sperling et al., "Cytokeratin 75 expression in central, centrifugal, cicatricial alopecia—new observations in normal and diseased hair follicles," Journal of Cutaneous Pathology, vol. 37, No. 2, 2010, pp. 243-248, 6 pages total.
Zhu et al., "*Silybum marianum* oil attenuates oxidative stress and ameliorates mitochondrial dysfunction in mice treated with D-galactose," Pharmacognosy Magazine, vol. 10, No. 37, 2014, pp. S92-S99, 8 pages total.

* cited by examiner

*Primary Examiner* — Rosanne Kosson
(74) *Attorney, Agent, or Firm* — Birch, Stewart, Kolasch & Birch, LLP

(57) ABSTRACT

The present invention relates to an extract of *Silybum marianum* (L.) Gaertn. akenes, as well as compositions containing this extract for application in the fields of cosmetics and dermatology for promoting hair growth.

21 Claims, No Drawings

EXTRACT OF *SILYBUM MARIANUM* (L.) GAERTN. AKENES FOR PROMOTING HAIR GROWTH

TECHNICAL FIELD OF THE INVENTION

The present invention relates to an extract of *Silybum marianum* (L.) Gaertn. akenes, as well as compositions containing this extract for application in the fields of cosmetics and dermatology to promote hair growth.

STATE OF THE ART

Hair care, not only for cosmetic purposes but also to prevent their loss and to regenerate it, has always inspired the spirit of research. Many theories have attempted to clarify the aetiology of hair loss in cases of baldness, alopecia, bald patch, etc., attributing this to increased tissue tension in the cranial sphere, reduced blood supply or certain endocrine or nervous disorders.

The hair follicle is a mini organ anchored in the skin down to the hypodermis whose main role is the production of the hair shaft. The distribution of hair follicles is established in the course of in utero growth and their number is determined genetically. The hair follicle is a dynamic structure which produces the hair in the course of the tissue growth and remodelling cycle. This cycle can be broken down into three phases:

A growth phase (anagen), the cells of the dermal papilla (fibroblasts) send a signal to the stem cells of the bulb which allows their proliferation. Cells will transform and envelop the dermal papilla to form the hair's sulphur matrix. They divide and differentiate into follicular keratinocytes, cells responsible for the structure of the hair. For the hair to be well structured, these keratinocytes need sulphur proteins, vitamin B6 and various minerals such as zinc and magnesium. The duration of this phase determines the length of the hair and depends on the proliferation and differentiation of the cells of the matrix at the base of the follicle.

A regression phase (catagen), the matrix dies and therefore the dermal papilla is no longer in contact with this matrix. There is no more exchange between the cells. The follicle and the dermal papilla travel up to the epidermis.

A resting phase (telogen), the cells of the dermal papilla and bulb are intact and inactive. The hair falls out. For a new hair to grow, the cycle must be restarted.

The hair is therefore constantly renewed and of the 100,000 to 150,000 hairs in a head of hair, the majority is in the growth phase. There is a normal and physiological loss of hair in the range of 60 to 100 per day for healthy hair. Beyond that, the fall is said to be pathological, whether it is occasional or established.

The term alopecia refers to the partial or general lack of hair on the head. Effluvium is excessive hair loss.

Many factors may be involved in alopecia such as, for example, genetic factors, age, gender, illness, stress, hormonal problems, side effects of medications, scarring. Several forms of alopecia can be distinguished:

Hereditary androgenetic alopecia, it is the most common; premature hair loss occurs in genetically predisposed subjects and particularly affects men. It manifests itself by a decrease in hair volume, even baldness and affects 50% of men over 50 years old.

Postmenopausal alopecia is the most common cause of baldness in women. Hair loss is more diffuse and extensive in women than in men. Diffuse female alopecia is a disorder that often starts during menopause and affects about 40% of women over the age of 70. The term diffuse illustrates that, unlike men, hair loss affects the entire scalp, evenly.

Acute or reactive alopecia, it can be linked to drug treatment (including cancer treatments), stress, childbirth, significant dietary deficiencies, iron deficiency, hormonal disorders, this is a simultaneous and diffuse loss of a large amount of hair.

Cicatricial alopecia, it can be caused by skin problems (tumour, burns, bald patch), acute irradiation, lupus erythematosus or parasites (ringworm, lichen).

Alopecia areata, it seems to be of autoimmune origin and is characterized by involvement in more or less large plaques and in one or more places.

Congenital alopecia, rare, it corresponds to the absence of a root or to hair abnormalities (mutations).

The term alopecia also covers a whole family of damage to the hair follicle, the final consequences of which are permanent, partial or general loss of hair.

We can distinguish diffuse hair loss and localized hair loss.

Diffuse hair loss: common alopecia, telogen effluvium, anagen effluvium, bald patch.

Among diffuse hair loss, the most common are common alopecia (male and female androgenetic alopecia) and telogen effluvium (after high fever, pregnancy, medication or severe diet).

Localized hair loss: androgenetic alopecia, bald patch, cicatricial alopecia, tumours. Localized hair loss is observed in the context of male androgenetic alopecia (temples, tonsure), bald patch, alopecia induced by traction (trichotillomania, braiding and straightening) or cicatricial alopecia (central centrifugal cicatricial alopecia, postmenopausal frontal fibrosing alopecia). We can also cite inflammatory cicatricial alopecia, in particular folliculitis of which dissecting folliculitis and folliculitis decalvans. Tumours and skin growths are also accompanied by localized hair loss (sebaceous hamartoma, basal cell carcinoma, squamous cell carcinoma).

Alopecia is essentially linked to a disruption in hair renewal which initially leads to an acceleration in the frequency of cycles at the expense of the quality of the hair and then of its quantity. The most frequent phenomenon is a reduction in the duration of the growth phase (anagen phase) related to a stop in cell proliferation. The results is a premature induction of the catagen phase and a greater number of hair follicles in the telogen phase and therefore greater loss of hair. To combat alopecia, it is therefore necessary to restart the hair cycle, for example by activating the anagen phase.

To date, various products have been put forward to combat alopecia, and in particular to induce or stimulate hair growth. Most combine several active ingredients which can have a beneficial effect on the biological parameters involved in hair loss. Among the most commonly encountered active ingredients, we can cite by way of example: vitamins such as vitamins A, F, B5, B6, C, H, and PP; trace elements such as zinc, copper, magnesium, silicon; protein derivatives such as peptides, sulphur-containing amino acids (methionine, cystine, cysteine or derivatives type); essential oils or extracts of plant origin of a lipophilic or hydrophilic nature, the list of which is not exhaustive; antifungal agents such as piroctone olamine, undecylenic derivatives, cyclopriroxolamine; synthetic chemical molecules known for their specific action on androgen receptors or on the activity of 5-α reductases. Minoxidil or 2,4-diamino-6-piperidino-pyrimidine 3-oxide is now the standard in the treatment of androgenetic alopecia. In spite of many theories being put forward about its mechanism of action, it is not clearly understood. In addition, its effectiveness remains limited, because even if there is a stabilization of hair loss in many clinical cases, we see a resumption of the alopecia process as soon as treatment is stopped. Its restrictive daily use is probably the cause of the unwanted side effects observed in patients using it long term, such as localized skin reactions or systemic effects. Furthermore, compositions comprising very diverse active agents are proposed in hair regrowth, these active agents possibly being derivatives of 2,4-di-aminopyrimidine 3-oxide such as those described in patent application EP0522964. Clinical studies have shown that PGF2α analogues have the property of inducing hair and eyelash growth in humans and animals (Johnstone, Am J Opht, 124 (4), 544-547, 1997). In humans, tests on the scalp have shown that a prostaglandin E2 analogue, viprostol, has the property of increasing hair density. Application WO98/33497 describes pharmaceutical compositions containing prostaglandins or prostaglandin derivatives intended to promote hair growth.

Thus, despite the many options currently available, consumers still need new products to promote hair regrowth that are natural and environmentally friendly, while being as effective as active chemicals.

Recent advances in understanding the biology of the hair cycle involve early and late type stem cells (Mesler et al. Cell Reports 19, 809-821, 2017). Moreover, these early stem cells have as progeny cells which produce certain keratins having essential functional properties in preventing hair loss. Among these keratins, K75 is the first to be produced, and its genetic deficiency in humans leads to pathological hair loss. This protein is characteristic of the cells forming the companion layer of the inner sheath of the root of the hair follicles (Gu and Coulombe J Invest Dermatol, 2007, 127 (5): 1061-73). In the study described by Sperling et al. (J Cutan Pathol 2010, 37: 243-248), it is shown that the expression of K75 strongly decreases during the process of early desquamation of the inner sheath of the root of the hair follicles. As this desquamation is a histological marker of alopecia, it is found that this K75 protein undoubtedly plays a key role in the mechanisms of alopecia.

The scientific name *Silybum marianum* (L.) Gaertn. designates a plant belonging to the Asteraceae family, annual or biennial, with a robust stem, which can reach more than one meter in height. Its large, shiny, alternate leaves without stipules are mottled white and edged with hard, pointed spines. The flowers are grouped in terminal heads, often solitary. They are surrounded by large thorny bracts with a very sharp end. The flowers, tubular, five-lobed, are purplish-crimson in colour. The fruits are shiny akenes, black or yellow-mottled, topped with a crest with denticulate bristles in a ring at their base. The common name of this plant is Milk Thistle.

Akene (often mistakenly referred to as seed in the literature) of *Silybum marianum* (L.) Gaertn. and its preparations are traditionally used orally, in the symptomatic treatment of functional digestive disorders attributed to hepatic origin.

The principal active ingredient in akene of *Silybum marianum* (L.) Gaertn. is silymarin, a mixture of several flavonolignans (mainly silybin, isosilybin, silychristin, and silydianin). Akenes contain up to 3% by weight of silymarin. They are also made up of oil (20-30% by weight), mucilages and proteins.

Silymarin has been the subject of numerous studies (in vitro, in vivo and clinical) having demonstrated its antioxidant, hepatoprotective, digestive, or even anti-inflammatory properties.

Currently, extracts of *Silybum marianum* (L.) Gaertn. akenes titrated in silymarin are present in several pharmaceutical preparations intended for the treatment of various hepatic and biliary disorders, such as Legalon®.

Silybin (a major silymarin flavonoid) has also been the subject of a very recent study in hair growth (Cheon et al., J Microbiol Biotech 29 (2), 321-329, 2019) via the Akt Wnt/β-catenin signalling.

Oil from *Silybum marianum* (L.) Gaertn. rich in omega 6 and vitamin E is mainly used in cooking. It is conventionally obtained from akenes by cold pressing. Studies on the antioxidant and hepatoprotective properties of such milk thistle oil, administered orally, have however been carried out in vivo on rats or mice (Zhu et al. Pharmacogn Mag. 10 (Suppl 1) S92-S99, 2014). Application WO2015/002338 describes an extract of *Silybum marianum* (L.) Gaertn. akenes poor in silymarin which has interesting properties for the treatment of acne, seborrhoea, rosacea or seborrheic dermatitis.

Thus, to date, no bibliographic data mentions that an extract of *Silybum marianum* (L.) Gaertn. akenes poor in silymarin may have hair regrowth activity and therefore be useful in the prevention anchor treatment of alopecia.

SUMMARY OF THE INVENTION

In an unexpectedly and surprising manner, the applicants have demonstrated that an extract of *Silybum marianum* (L.) Gaertn. akenes poor in silymarin has pharmacological activities of interest in the field of treatment and/or prevention to combat hair loss, especially by promoting their growth.

In fact, the inventors have shown that an extract of *Silybum marianum* (L.) Gaertn. akenes poor in silymarin induces an increase in the expression of the protein. Keratin 75 in the follicles. Thus, the extract of *Silybum marianum* (L.) Gaertn. akenes poor in silymarin will help to delay and prevent hair loss and extend the hair's life cycle.

According to a first aspect, the invention relates to an extract of *Silybum marianum* (L.) Gaertn. akenes comprising less than 0.2%, preferably less than 0.1% by weight of silymarin relative to the weight of the dry extract for its use to promote hair growth and in particular to treat or prevent alopecia such as androgenetic alopecia, reactive alopecia, postmenopausal alopecia or alopecia areata, or even cicatricial alopecia, especially folliculitis and preferably dissecting folliculitis.

The invention also relates to the use, especially cosmetic or dermatological use, of an extract of *Silybum marianum* (L.) Gaertn. akenes comprising less than 0.2%, preferably less than 0.1% by weight of silymarin relative to the weight of the dry extract to promote hair growth and in particular to treat or prevent alopecia such as androgenetic alopecia, reactive alopecia, postmenopausal alopecia or alopecia areata, or even cicatricial alopecia, especially folliculitis and preferably dissecting folliculitis.

The invention also relates to the use of an extract of *Silybum marianum* (L.) Gaertn. akenes comprising less than 0.2%, preferably less than 0.1% by weight of silymarin relative to the weight of the dry extract for the preparation of a cosmetic or dermatological composition intended to promote hair growth and in particular to treat or prevent alopecia such as androgenetic alopecia, reactive alopecia, postmenopausal alopecia or alopecia areata, or even cicatricial alopecia, especially folliculitis and preferably dissecting folliculitis.

The invention also relates to a method, especially a cosmetic or dermatological method, for promoting hair growth and in particular for treating or preventing alopecia such as androgenetic alopecia, reactive alopecia, postmenopausal alopecia or alopecia areata, especially folliculitis and preferably dissecting folliculitis, comprising administrating to a person in need thereof an effective amount of an extract of *Silybum marianum* (L.) Gaertn. akenes comprising less than 0.2%, preferably less than 0.1% by weight of silymarin relative to the weight of the dry extract.

According to a second aspect, the present invention relates to a dermatological or cosmetic composition comprising at least one extract of *Silybum marianum* (L.) Gaertn. akenes comprising less than 0.2%, preferably less than 0.1% by weight of silymarin relative to the weight of the dry extract, with at least one dermatologically or cosmetically acceptable excipient for its use to promote hair growth and in particular for the treatment or prevention of alopecia such as androgenetic alopecia, reactive alopecia, postmenopausal alopecia or alopecia areata, or even cicatricial alopecia, especially folliculitis and preferably dissecting folliculitis.

The invention also relates to the use of a dermatological or cosmetic composition comprising at least one extract of *Silybum marianum* (L.) Gaertn. akenes comprising less than 0.2%, preferably less than 0.1% by weight of silymarin relative to the weight of the dry extract, with at least one dermatologically or cosmetically acceptable excipient, to promote hair growth and in particular to treat or prevent alopecia such as androgenetic alopecia, reactive alopecia, postmenopausal alopecia or alopecia areata, or even cicatricial alopecia, especially folliculitis and preferably dissecting folliculitis.

The invention also relates to the use of a dermatological or cosmetic composition comprising at least one extract of *Silybum marianum* (L.) Gaertn. akenes comprising less than 0.2%, preferably less than 0.1% by weight of silymarin relative to the weight of the dry extract, with at least one dermatologically or cosmetically acceptable excipient, for the preparation of a medicinal product intended to promote hair growth and in particular to treat or prevent alopecia such as androgenetic alopecia, reactive alopecia, postmenopausal alopecia or alopecia areata, or even cicatricial alopecia, especially folliculitis and preferably dissecting folliculitis.

The invention also relates to a method, especially a cosmetic or dermatological method, for promoting hair growth and in particular for treating or preventing alopecia such as androgenetic alopecia, reactive alopecia, postmenopausal alopecia or alopecia areata, or even cicatricial alopecia, especially folliculitis and preferably dissecting folliculitis, comprising administrating to a person in need thereof an effective amount of a dermatological or cosmetic composition comprising at least one extract of *Silybum marianum* (L.) Gaertn. akenes comprising less than 0.2%, preferably less than 0.1% by weight of silymarin relative to the weight of the dry extract, with at least one dermatologically or cosmetically acceptable excipient.

According to a third aspect, the present invention relates to a process for dermatological treatment of an area of scalp devoid of hair, comprising topical application to the area of scalp devoid of hair of an extract of *Silybum marianum* (L.) Gaertn. akenes comprising less than 0.2%, preferably less than 0.1% by weight of silymarin relative to the weight of the dry extract or of a dermatological composition comprising at least one extract of *Silybum marianum* (L.) Gaertn. akenes comprising less than 0.2%, preferably less than 0.1% by weight of silymarin relative to the weight of the dry extract, with at least one dermatologically acceptable excipient, prior to or concomitantly with a hair transplant or a medical treatment of the scalp such as a treatment with platelet-rich plasma or a capillary mesotherapy.

DETAILED DESCRIPTION OF THE INVENTION

Definitions

In the present description, the plant *Silybum marianum* (L.) Gaertn. may be designated in an abbreviated manner by the term *Silybum marianum*.

By "Silymarin", is meant, within the meaning of the present invention, a purified extract of *Silybum marianum* (L.) Gaertn. akenes comprising mainly (at least 95% by weight) a mixture of the following four flavonolignans: silybin, isosilybin, silychristin and silydianin (Kuki et al., Chromatographia 75: 175-180, 2012). A silymarin content of less than 0.2% by weight therefore means that the total amount of the constituents of silymarin is less than 0.2% by weight. Such a content can be determined in particular by HPLC (High Performance Liquid Chromatography) or UPLC (Ultra high Performance Liquid Chromatography) by calculating the total area of the peaks corresponding to all the constituents of silymarin, in particular by using a reference sample of silymarin, which can be obtained for example from Sigma Aldrich, to determine the position of these peaks.

By "silybin", also called silibinin in the art, is meant, within the meaning of the present invention, the four diastereoisomers silybin A, silybin B, 2,3-cis-silybin A and 2,3-cis-silybin B.

By "isosilybin" is meant, within the meaning of the present invention, the two diastereoisomers isosilybin A and isosilybin B.

By "silychristin" is meant, within the meaning of the present invention, the two diastereoisomers silychristin A and silychristin B.

By "approximately" is meant in the present description that the value concerned may be less than or greater by 10%, in particular 5%, in particular 2%, more particularly 1%, than the value indicated.

For the purposes of the present invention, the term "dry extract" is understood to mean an extract devoid of extraction solvent or support or containing it only in the form of a non-significant trace. Such a dry extract thus contains only material derived from *Silybum marianum* (L.) Gaertn. It may also contain non-significant traces of extraction solvent.

By "organic solvent immiscible with the oil obtained from akenes of *Silybum marianum* (L.) Gaertn." is meant, within the meaning of the present invention, an organic solvent which is not capable of mixing, or only partially, with the oil obtained from akenes of *Silybum marianum* (L.) Gaertn., so that the mixture of the organic solvent and of the oil obtained from akenes of *Silybum marianum* (L.) Gaertn. gives a heterogeneous mixture in which at least two distinct phases can be observed.

By "fatty acid" is meant, within the meaning of the present invention, a carboxylic acid $R1\text{-}CO_2H$ whose chain R1 is a linear or branched hydreocarbon chain, saturated or comprising C=C double bonds, the carboxylic acid comprising from 16 to 22 carbon atoms (including the carbon atom of the carboxylic acid function).

By "free" fatty acid (including linoleic acid) is meant, within the meaning of the present invention, a fatty acid not bound to other molecules (for example to glycerol or derivatives thereof to give glycerides or an alcohol to give a fatty ester).

By "tocopherol" is meant, within the meaning of the present invention, α-tocopherol, β-tocopherol, γ-tocopherol and δ-tocopherol.

By "$C_1$ to $C_3$ alcohol" is meant, within the meaning of the present invention, an R2-OH alcohol in which the R2 chain is a saturated, linear or branched hydrocarbon chain comprising 1 to 3 carbon atoms. It may be methanol, ethanol, n-propanol or isopropanol, in particular methanol, ethanol or isopropanol. Preferably, it will be ethanol or isopropanol, in particular ethanol.

By "room temperature" is meant, within the meaning of the present invention, a temperature of 15 to 40° C., preferably 20 to 30° C., in particular of about 25° C.

By "hair and body hair" is meant the hair, the body hair, the eyebrows, the eyelashes and/or the coat, preferably the hair.

By "hair growth" is meant the growth of hair and/or body hair as defined above, preferably hair.

By "alopecia" is meant the total or partial loss of hair and/or body hair, for example linked to reduction in hair growth and/or acceleration of hair and/or body hair loss. This term includes but is not limited to androgenetic alopecia, postmenopausal alopecia, reactive alopecia, cicatricial alopecia, alopecia areata, and congenital alopecia. Preferably, it will be androgenetic alopecia, postmenopausal alopecia, reactive alopecia or alopecia areata. The consequences of alopecia are a temporary or permanent and partial or total absence of hair and/or body hair.

By "bald patch" is meant a massive loss of hair in patches, most often on the scalp. The individuals affected have patches without hair, more commonly round or oval in shape. On the other hand, the scalp is not affected and show no scars.

By "scalp area devoid of hair" is meant an area of the scalp, whatever its size, which does not contain hair, or in which not enough hair grows to cover the area in question. It can be a bald patch or partial or total alopecia.

By "folliculitis" is meant inflammation of one or more hair follicles, forming a papulopustule. It can therefore occur at any spot where there is hair. It can be bacterial, fungal, viral or non-infectious in origin. Folliculitis can be superficial, ostiofolliculitis, or deep. There are different forms of folliculitis, such as dissecting folliculitis or folliculitis decalvans. Dissecting folliculitis of the scalp is a chronic and rare suppurating dermatosis of the scalp. It manifests in the form of many painful follicular and perifollicular inflammatory nodules, pustules and abscesses which interconnect via the sinus tracts, which eventually leads to cicatricial alopecia. Quinquaud's folliculitis decalvans is also an inflammatory cicatricial alopecia of the scalp, chronic and rare, occurring in middle-aged adults and characterised by the development of alopecic patches that extend slowly and centrifugally mainly at the top and in the occipital zone of the scalp, associated with perifollicular erythema, pustules and haemorrhagic scabs.

The term "treating" alopecia is understood to mean stopping alopecia, reducing alopecia and/or alleviating alopecia. Thus, "treating" alopecia includes limiting hair and/or body hair loss and/or promoting hair and/or body hair growth, increasing hair follicle density and/or regulating phases of the hair follicle cycle.

The term "preventing" alopecia is understood to mean reducing the risk of developing alopecia, or slowing the progression of alopecia in a mammal, preferably a man, which is susceptible to developing alopecia.

The term "limit" is understood to mean slowing down, reducing, decreasing and/or stopping.

The term "promote" is understood to mean to increase, promote, amplify and/or accelerate.

In the present invention, the term "cosmetically or dermatologically acceptable" is intended to denote that which is useful in the preparation of a cosmetic or dermatological composition, which is generally safe, non-toxic and neither biologically nor otherwise undesirable and which is acceptable for cosmetic or dermatological use, in particular by topical application to the hair and/or scalp.

By "topical application" is meant an application to the skin, in particular to the scalp, the mucous membranes, the hair and/or the body hair, in particular to the hair and/or the scalp.

Extract According to the Invention

The extract according to the invention is an extract of *Silybum marianum* akenes comprising less than 0.2%, preferably less than 0.1% by weight of silymarin relative to the weight of the dry extract.

According to a particular embodiment, the extract according to the invention contains at least 3% by weight, preferably at least 4% by weight of free linoleic acid relative to the weight of the dry extract. In particular, the extract according to the invention contains between 3% and 25%, for example between 3 and 15% by weight, especially between 4% and 10% by weight, in particular between 4% and 6% by weight, for example about 5% by weight of free linoleic acid relative to the weight of the dry extract. The silymarin/free linoleic acid mass ratio of the extract according to the invention may in particular be less than 0.07, in particular less than 0.05 and in particular less than 0.01.

The extract according to the invention may also comprise between 10% and 70%, in particular between 10% and 50%, more particularly between 10% and 30% by weight, in particular between 15% and 25% by weight of free fatty acids relative to the weight of the dry extract.

According to a particular embodiment, the extract according to the invention contains at least 0.01% by weight, especially 0.05% by weight of tocopherols relative to the weight of the dry extract. In particular, the extract according to the invention contains between 0.01% and 2% by weight, more particularly between 0.01% and 1% by weight, even more particularly between 0.01% and 0.5% by weight, in particular between 0.05% and 0.2% by weight, for example approximately 0.1% by weight of tocopherols relative to the weight of the dry extract. The silymarin/tocopherols mass ratio of the extract according to the invention may in particular be less than 1, in particular less than 0.1.

According to another particular embodiment, the extract according to the invention contains between 3% and 25% by weight, for example between 3 and 20% by weight, in particular between 3% and 15% by weight, in particular between 4% and 10% by weight, in particular between 4% and 6% by weight, for example approximately 5% by weight of free linoleic acid relative to the weight of the dry extract; and between 0.01% and 2% by weight, in particular between 0.01% and 1% by weight, even more particularly between 0.01% and 0.5% by weight, in particular between 0.05% and 0.2% by weight, for example about 0.1% by weight of tocopherols relative to the weight of the dry extract. In particular, the silymarin/free linoleic acid mass ratio of the extract according to the invention may in particular be less than 0.07, in particular less than 0.01 and the silymarin/tocopherols mass ratio of the extract according to the invention may in particular be less than 1, in particular less than 0.1.

Preferably, the extract according to the present invention will be a dry extract.

According to a preferred embodiment, the extract according to the invention is obtainable by a process according to the invention described below Process for Preparing the Extract According to the Invention A process for preparing an extract according to the invention comprises in particular a step of extracting an oil obtained from akenes of *Silybum marianum* (L.) Gaertn. by an extraction solvent comprising, in particular consisting of, an aqueous hydrotropic solution, subcritical water or an organic solvent immiscible with the oil obtained from akenes of *Silybum marianum* (L.) Gaertn. optionally in mixture with water.

According to a particular embodiment, the extraction solvent comprises, in particular consists of, an organic solvent immiscible with the oil obtained from akenes of *Silybum marianum* (L.) Gaertn. optionally in mixture with water.

The organic solvent immiscible with the oil obtained from akenes of *Silybum marianum* (L.) Gaertn. may in particular be a $C_1$ to $C_3$ alcohol.

The extraction solvent may in particular be a $C_1$ to $C_3$ alcohol optionally in mixture with water.

The organic solvent immiscible with the oil obtained from akenes of *Silybum marianum* (L.) Gaertn., in particular a $C_1$ to $C_3$ alcohol such as methanol, ethanol or isopropanol, in particular ethanol or isopropanol, preferably ethanol, may be used as a mixture with water, in particular in an organic solvent/water volume ratio of 70/30 to 100/0, in particular from 80/20 to 100/0, for example about 80/20 or 90/10.

The extraction solvent may in particular be chosen from methanol, a methanol/water mixture, ethanol, an ethanol/water mixture, isopropanol and an isopropanol/water mixture, in particular an ethanol/water mixture or an isopropanol/water mixture, preferably an ethanol/water mixture.

According to a particular embodiment, the extraction solvent will be methanol, an ethanol/water mixture in a volume ratio of approximately 80/20 or 90/10 or an isopropanol/water mixture in a volume ratio of approximately 90/10.

The step of extracting oil from akenes of *Silybum marianum* will be carried out in particular by mixing the oil obtained from akenes of *Silybum marianum* with the extraction solvent for 1 to 12 h and in particular at a temperature between 15 and 25° C., especially around 20° C. The amount of extraction solvent used to carry out this extraction will advantageously be from 0.5 to 3 g, in particular from 1 to 3 g per 1 g of oil obtained from akenes of *Silybum marianum* (L.) Gaertn.

An extraction phase and a lipid phase will then be obtained at the end of this extraction. The extraction phase will advantageously be separated from the lipid phase and recovered before being dried (in particular by evaporation of the extraction solvent), partially or totally, in particular under vacuum, in order to more or less remove the extraction solvent and obtain either the dry extract if the solvent is totally removed, or the concentrated extract which is diluted in residual solvent.

The oil obtained from akenes of *Silybum marianum* may advantageously be obtained by extraction from akenes of *Silybum marianum* (L.) Gaertn. (the akenes can be whole or in pieces), in particular by pressing, advantageously by cold pressing (that is to say without heating), at room temperature).

According to one embodiment according to the invention, the method according to the invention will comprise the following two successive steps:
(i) Extracting an oil from akenes of *Silybum marianum* (L.) Gaertn., and
(ii) Extracting the oil obtained from akenes of *Silybum marianum* (L.) Gaertn. with an extraction solvent, comprising, in particular consisting of, a hydrotropic aqueous solution, subcritical water or an organic solvent immiscible with the oil obtained from akenes of *Silybum marianum* (L.) Gaertn. optionally in mixture with water.

According to a preferred embodiment according to the invention, the method according to the invention will comprise the following successive steps:
(i) Optionally extracting an oil from akenes of *Silybum marianum* (L.) Gaertn.,
(ii) Extracting the oil obtained from akenes of *Silybum marianum* (L.) Gaertn. with an extraction solvent, comprising, in particular consisting of a hydrotropic aqueous solution, subcritical water or an organic solvent immiscible with the oil obtained from akenes of *Silybum marianum* (L.) Gaertn. optionally in mixture with water,
(iii) Recovering the extraction phase obtained in step (ii), and
(iv) Partially or totally drying the extraction phase to give a concentrated or dry extract according to the invention.

Step (i) will advantageously be carried out by cold pressing the akenes of *Silybum marianum* (L.) Gaertn., whole or in pieces.

Step (ii) will advantageously be carried out with an extraction solvent as defined above, and in particular chosen from methanol, a methanol/water mixture, ethanol, an ethanol/water mixture, isopropanol, and an isopropanol/water mixture.

The extraction solvent may in particular be an organic solvent immiscible with the oil obtained from akenes of *Silybum marianum* (L.) Gaertn, in particular a $C_1$ to $C_3$ alcohol such as methanol, ethanol or isopropanol, optionally as a mixture with water, in particular in an organic solvent/water volume ratio of between 80/20 and 100/0, in particular between 85/15 and 95/5, in particular of approximately 90/10. An advantageous extraction solvent is an isopropanol/water mixture in a volume ratio of about 90/10.

The extraction step (n) can be carried out by mixing the oil obtained from akenes of *Silybum marianum* with the extraction solvent for 1 to 12 h and in particular at a temperature of 15 to 25° C., in particular of about 20° C. The amount of extraction solvent used to carry out this extraction will advantageously be from 0.5 to 3 g, in particular from 1 to 3 g per 1 g of oil obtained from akenes of *Silybum marianum* (L.) Gaertn.

This extraction step (ii) makes it possible to obtain at the end an extraction phase of interest and a lipid phase.

Step (iii) will advantageously be carried out by separating the extraction phase from the lipid phase.

Step (iv) will advantageously be carried out under vacuum.

Cosmetic and Dermatological Applications

According to a first aspect, the invention relates to an extract of *Silybum marianum* (L.) Gaertn. akenes comprising less than 0.2%, preferably less than 0.1% by weight of silymarin relative to the weight of the dry extract for its use to promote hair growth.

The invention also relates to an extract of *Silybum marianum* (L.) Gaertn. akenes comprising less than 0.2%, preferably less than 0.1% by weight of silymarin relative to the weight of the dry extract according to the invention for its use to treat or prevent alopecia such as androgenetic alopecia, reactive alopecia, postmenopausal alopecia or aerate alopecia, or even to treat dissecting folliculitis.

The extract of *Silybum marianum* (L.) Gaertn. akenes comprising less than 0.2%, preferably less than 0.1% by weight of silymarin relative to the weight of the dry extract according to the invention can be used in conjunction with a hair transplant, in particular during micro-transplantation of follicular units. A follicular unit represents a group of hairs, assembled together naturally in the scalp in small bundles, which can contain from one to four hairs. The use of an extract of *Silybum marianum* (L.) Gaertn. akenes comprising less than 0.2%, preferably less than 0.1% by weight of silymarin relative to the weight of the dry extract according to the invention is perfectly suitable, in particular in conjunction with a laser hair transplant.

The extract of *Silybum marianum* (L.) Gaertn. akenes comprising less than 0.2%, preferably less than 0.1% by weight of silymarin relative to the weight of the dry extract according to the invention can also be used in conjunction with a treatment based on platelet-rich plasma (PRP). This is a platelet concentrate, and therefore rich in growth factors, which is injected into the scalp.

The extract of *Silybum marianum* (L.) Gaertn. akenes comprising less than 0.2%, preferably less than 0.1% by weight of silymarin relative to the weight of the dry extract according to the invention can also be used in conjunction with a capillary mesotherapy. This is a commonly used technique in medical and aesthetic fields which consists in injecting various polyvitamins into the dermis of the scalp to nourish the hair follicle in depth, which makes it possible to treat the hair at the same time as improving blood circulation in the scalp. Generally, two months of treatment suffice to normalise the loss and sometimes increase hair density.

The extract of *Silybum marianum* (L.) Gaertn. akenes comprising less than 0.2%, preferably less than 0.1% by weight of silymarin relative to the weight of the dry extract according to the invention can therefore be used prior to or concomitantly with a hair transplant or a medical treatment of the scalp such as a treatment with platelet-rich plasma or a capillary mesotherapy.

According to a second aspect, the present invention relates to a dermatological or cosmetic composition comprising at least one extract of *Silybum marianum* (L.) Gaertn. akenes comprising less than 0.2%, preferably less than 0.1% by weight of silymarin relative to the weight of the dry extract according to the invention, with at least one dermatologically or cosmetically acceptable excipient for its use to promote hair growth. The invention also relates to a dermatological or cosmetic composition comprising at least one extract of *Silybum marianum* (L.) Gaertn. akenes comprising less than 0.2%, preferably less than 0.1% by weight of silymarin relative to the weight of the dry extract according to the invention, with at least one dermatologically or cosmetically acceptable excipient for its use in the treatment or prevention of alopecia such as androgenetic alopecia, reactive alopecia, postmenopausal alopecia, or areata alopecia, or even to treat dissecting folliculitis.

The dermatological or cosmetic composition comprising at least one extract of *Silybum marianum* (L.) Gaertn. akenes comprising less than 0.2%, preferably less than 0.1% by weight of silymarin relative to the weight of the dry extract according to the invention, with at least one dermatologically or cosmetically acceptable excipient can be used in conjunction with a hair transplant, especially a laser hair transplant.

The dermatological or cosmetic composition comprising at least one extract of *Silybum marianum* (L.) Gaertn. akenes comprising less than 0.2%, preferably less than 0.1% by weight of silymarin relative to the weight of the dry extract according to the invention, with at least one dermatologically or cosmetically acceptable excipient can also be used in conjunction with a treatment based on platelet-rich plasma (PRP).

The dermatological or cosmetic composition comprising at least one extract of *Silybum marianum* (L.) Gaertn. akenes comprising less than 0.2%, preferably less than 0.1% by weight of silymarin relative to the weight of the dry extract according to the invention, with at least one dermatologically or cosmetically acceptable excipient can also be used in conjunction with a capillary mesotherapy.

The dermatological or cosmetic composition comprising at least one extract of *Silybum marianum* (L.) Gaertn. akenes comprising less than 0.2%, preferably less than 0.1% by weight of silymarin relative to the weight of the dry extract according to the invention, with at least one dermatologically or cosmetically acceptable excipient can therefore be used prior to or concomitantly with a hair transplant or a medical treatment of the scalp such as a treatment with platelet-rich plasma or a capillary mesotherapy.

Advantageously, the extract included in the dermatological or cosmetic composition is as described above.

According to a third aspect, the present invention relates to a process for dermatological treatment of an area of scalp devoid of hair, comprising topical application to the area of scalp devoid of hair of an extract of *Silybum marianum* (L.) Gaertn. akenes comprising less than 0.2%, preferably less than 0.1% by weight of silymarin relative to the weight of the dry extract according to the invention or of a dermatological composition comprising at least one extract of *Silybum marianum* (L.) Gaertn. akenes comprising less than 0.2%, preferably less than 0.1% by weight of silymarin relative to the weight of the dry extract according to the invention, with at least one dermatologically acceptable excipient, prior to or concomitantly with a hair transplant or a medical treatment of the scalp such as a treatment with platelet-rich plasma or a capillary mesotherapy.

Preferably, this dermatological treatment according to the invention precedes a hair transplant, especially a laser transplant.

According to a particular embodiment of the invention, the process for dermatological treatment according to the invention is carried out over 1 to 6 weeks, preferably 1 to 4 weeks and even more preferably 2 to 4 weeks prior to a hair transplant or a medical treatment of the scalp such as a treatment with platelet-rich plasma or a capillary mesotherapy.

The invention is preferably aimed at an extract and a cosmetic or dermatological composition according to the invention which is provided in its own form and suitable for topical application, in particular to the scalp and/or the hair.

The cosmetic or dermatological composition according to the invention can thus be provided in the forms which are usually known for topical administration, that is to say in particular lotions, shampoos, balms, foams, gels, dispersions, emulsions, sprays, serums, masks or creams, with excipients allowing in particular penetration in order to improve the properties and accessibility of the active principle.

Advantageously, the composition according to the invention can be in the forms which are usually known for topical administration to the hair and the scalp, that is to say in particular a shampoo, a conditioner, a hair cream, a hair lotion, a mask or a spray, in particular not requiring rinsing.

A distinction is thus made between formulated products which can be rinsed and formulated products which do not require rinsing.

Preferably, the composition according to the invention has a light texture further allowing optimum penetration without greasing the hair and/or body hair, or the scalp.

These compositions generally contain, in addition to the extract according to the present invention, a physiologically acceptable medium, generally based on water or on a solvent, for example alcohols, ethers or glycols. They can also contain surfactants, complexing agents, preservatives, stabilizers, emulsifiers, thickeners, gelling agents, humectants, emollients, trace elements, essential oils, perfumes, colorants, moisturizers, etc.

According to a particular embodiment, the composition according to the invention comprises, as a cosmetically or dermatologically acceptable excipient, isopropanol, polyethylene glycol (PEG) or a mixture of these. Thus, advantageously, the composition according to the present invention will comprise, in particular will consist of, an extract according to the invention, isopropanol and PEG. The isopropanol/PEG mass ratio will advantageously be between 1/2 and 2/1, in particular between 1/1.5 and 1.5/1, in particular will be around 1/1.

The PEG may in particular have a number-average molecular weight of between 200 and 600 g/mol, in particular between 200 and 500 g/mol, in particular between 200 and 400 g/mol, for example between 250 and 350 g/mol, in particular about 300 g/mol. This could in particular be PEG 300.

In another particular embodiment of the invention, the composition according to the invention is characterized in that it is in a form suitable for oral administration.

The composition according to the invention may then be in the forms which are usually known for oral administration, that is to say in particular tablets, capsules, powders, granules and oral solutions or suspensions. When preparing a solid composition in the form of tablets, the main active ingredient can be mixed with a cosmetic or dermatological vehicle such as gelatine, starch, lactose, magnesium stearate, talc, gum arabica, silica or the like. The tablets can be coated with sucrose or other suitable materials or they can be processed so that they have prolonged or delayed activity and continuously release a predetermined amount of active. A capsule preparation can be obtained by mixing the active ingredient with a diluent and pouring the resulting mixture into soft or hard capsules.

Advantageously, the composition according to the present invention comprises 0.01 to 15% by weight, preferably 0.1 to 10% by weight, of an extract according to the invention relative to the total volume of the composition.

EXAMPLES

Example 1: Preparation of Extracts

Process according to the invention giving an isopropanolic 90 extract (extract I) comprising a low silymarin content.

Cold pressing of akenes of *Silybum marianum* to obtain an oil obtained from akenes of *Silybum marianum*, Extraction of the oil obtained from akenes of *Silybum marianum* by an isopropanol/water mixture (90/1.0 v/v) with 1 gram of the isopropanol/water mixture per gram of oil for 2 hours at 20° C., Recovery of the isopropanolic phase, and Evaporation of the solvent.

Methanolic (extract M) and ethanolic (extract E) extracts were obtained in a similar manner by replacing the isopropanol/water mixture (90/10 v/v) respectively with methanol and an ethanol/water mixture (90/10 v/v). The oil obtained from akenes of *Silybum marianum* is extracted respectively with 3 volumes of methanol and 3 volumes of the ethanol/water mixture (90/10 v/v) for 1 volume of oil for 2 hours at 20° C. These different extracts were characterized by UPLC (ultra high performance liquid chromatography) or by GC-MC (gas chromatography coupled to mass spectrometry) according to the protocols detailed below.

Protocol for Evaluation of the Extracts Obtained

Protocol 1: Evaluation of Silymarin Content by UPLC

Preparation of the Sample and the Control:

Silymarin control: prepare a 5 mg solution of silymarin in 10 ml of a methanol/water mixture (60:40) (v/v).

Sample: heat the dry extract to be analysed (extract M, E or I) at 35° C. with stirring until a homogeneous and clear solution is obtained. Weigh exactly 200 mg of the extract, dissolve it in 10 ml of a methanol/dichloromethane mixture allowing total solubilization of the extract and homogenize the solution. This mixture ranges from the methanol/dichloromethane (1:1) (v/v) ratio to pure methanol.

Analytical Conditions:

Column: Acquity BEH Shield C18 150 mm×2.1 mm-1.7 μm (Waters)

Mobile Phase:

A: water+0.1% formic acid

B: Acetonitrile+0.1% formic acid

Gradient according to Table 1 below:

TABLE 1

| T (min) | A (%) | B (%) |
|---|---|---|
| 0 | 90 | 10 |
| 15 | 60 | 40 |
| 20 | 0 | 100 |
| 39.5 | 0 | 100 |
| 40 | 90 | 10 |
| 45 | 90 | 10 |

Column temperature: 40° C.

Flowrate: 0.4 ml/min

Detection: 287 nm

Injection volume: 1 μL.

Protocol 2: Evaluation of Linoleic Acid Content by UPLC

Preparation of the Sample and the Control:

Linoleic acid control: prepare a 10 mg solution of linoleic acid in 10 ml of a methanol/dichloromethane (1:1) (v/v) mixture.

Sample: heat the dry extract to be analysed (extract M, E or I) at 35° C. with stirring until a homogeneous and clear solution is obtained. Weigh exactly 50 mg of the extract, dissolve it in 1 ml of a methanol/dichloromethane mixture allowing total solubilization of the extract and homogenize the solution. This mixture ranges from the methanol/dichloromethane (1:1) (v/v) ratio to pure methanol.

Analytical Conditions:
  Column: Acquity BEH Shield C18 150 mm×2.1 mm-1.7 µm (Waters)
Mobile Phase:
  A: water+0.1% formic acid
  B: Acetonitrile+0.1% formic acid
  Gradient according to Table 2 below:

TABLE 2

| T (min) | A (%) | B (%) |
|---|---|---|
| 0 | 50 | 50 |
| 1 | 50 | 50 |
| 10 | 0 | 100 |
| 15 | 0 | 100 |
| 15.5 | 50 | 50 |
| 20 | 50 | 50 |

Column temperature: 40° C.
  Flowrate: 0.4 ml/min
  Detection: 215 nm
  Injection volume: 1 µL.
Protocol 3: Evaluation of Fatty Acid Content by GC-MS
Preparation of the Sample:
  Heat the dry extract to be analysed to 35° C. with stirring until a clear homogeneous liquid is obtained.
  Solubilize 20 mg of the extract in 800 µl of a methanol/dichloromethane (1:1) (v/v) mixture.
  Add 200 µl of the derivatizer N,O-Bis(trismethylsilyl)trifluoroacetamide (BSTFA)+Trimethylchlorosilane (TMCS) (99:1) (Supelco-Sigma Alrich).
  Vortex for 1 minute.
Gas Chromatography (GPC) Conditions:
  Column: DB-5 ms (Agilent Technologies); 30 m×0.25 mm; 0.25 µm
  Injection: T=300° C.; Mode=Split; Split ratio=100:1.
  Furnace: temperature gradient (° C.)
    Initial temperature=150° C.
    Gradient=7° C./min up to final temperature=340° C.
    Maintain at 340° C. for 10 minutes
  Carrier gas flow rate: 1 ml/min
  Detection: MS-EI, T=300° C., Scan time=0.2 sec; Full Scan Start Mass=40; Full Scan End Mass=600.
  Injection volume: 1 µL
Results
  The extract I of *Silybum marianum* akenes according to the invention poor in silymarin contains mainly substances with a retention time of between 13 and 30 minutes by UPLC.
  The silymarin content of extracts I was determined by UPLC after calibration with control solutions of commercial silymarin (Sigma Aldrich).
  Extract I contains 0.06% by mass of silymarin.
  The free fatty acids contents, and more particularly of linoleic acid, in extract I were determined by UPLC and by GPC and are presented in Table 3 below

TABLE 3

| Components | % by weight |
|---|---|
| Free fatty acids (mainly palmitic, oleic and linoleic acids) | 24.6 |
| Of which linoleic acid | 5.1 |

The inventors Were able to demonstrate that the UPLC and GPC profiles of the 3 akenes extracts according to the invention obtained by methanolic (extract M), ethanolic 90 (extract E) and isopropanolic 90 (extract I) extraction are similar.
  The various analyses carried out by UPLC and GC-MS made it possible to demonstrate the following characteristics:
  The isopropanolic 90 extract of akenes according to the invention (extract I) contains almost no silymarin, particularly polar flavonolignans.
  The UPLC and GPC profiles of the 3 extracts of akenes according to the invention obtained by methanolic, ethanolic 90 and isopropanolic 90 extraction are very similar.

Example 2: Quantification of Protein Keratin 75 in Forehead Follicles of Human Subjects The aim of this example is to evaluate the effects of an extract of *Silybum marianum* (L.) Gaertn. akenes comprising less than 0.2% by weight of silymarin on the expression of the Keratin 75 protein in humans. Indeed, such a pharmacological activity is of interest in the field of treatment and/or prevention of hair loss, especially by promoting their growth.
Methods
  A topical preparation of extract I prepared in example 1 was formulated at 1.75% or 7.0% (w/v) of the dry extract in an isopropanol/PEG 300 (1:1) mixture (w/w), then put in a spray for application twice a day for the duration of treatment.
  Thirteen healthy volunteers were followed for 4 to 12 weeks depending on their availability. This study was carried out in accordance with the Declaration of Helsinki, with the written consent of each subject. This is a longitudinal observational single-centre study. The subjects were followed in a private practice with close supervision by the same staff throughout the study, supplemented by permanent digital contacts and exchanges with the subjects. Weekly monitoring based on digital installations has been installed. A follicle sample was taken at each visit.
  Cyanoacrylate follicle samples were taken from the forehead in subjects according to Piérard et al. (Scientific World Journal, 2014 ID 463634, 2014) using a drop of 2-ethyl cyanoacrylate adhering to a glass microscope slide.
Protein Extraction:
  The biopsies are detached from the glass slide in distilled water for 30 minutes at room temperature, cut into small parts and then homogenized in a 2 mM Tris-HCl extraction buffer, pH 6.8, 3% SDS, 10 mM sodium pyrophosphate, 5 mM EDTA, and 2 mM sodium vanadate. The samples are heated at 50° C. for 3 hours. The extracts are centrifuged at 10,000 rpm for 10 minutes. The determination of the proteins in the supernatants is carried out by the method according to Bradford (Anal Biochem 72: 248-254, 1976) using the Bio-Rad reagent (Cressier, Switzerland). The sebocyte cultures are washed with PBS buffer then the cells are lysed in a specific buffer (50 mM Tris-HCl pH 7.4, 150 mM NaCl, 1 mM EDTA, 1% Triton™ X-100). The suspensions are passed through a sonicator and then analysed by the Bradford method.
  Protein samples are analysed by Western Blot using a standard procedure and the following antibody: polyclonal rabbit anti-human IgG K75, dilution 1:5000 (Fisher Scientific, Reinach, Switzerland).
  Proteomic analysis was performed by electrophoresis (SDS-PAGE), followed by Coomassie staining. The coloured protein bands are harvested and analysed on the University of Geneva's proteomics platform.
Results The level of expression of the K75 protein (densitometric unit of western blot bands) in the hair follicles of the forehead of human subjects is shown in Table 4 below before and after treatment with an extract according to the invention.

TABLE 4

| Subject | Before treatment | After treatment | Duration of treatment (weeks) | Extract concentration (%) |
|---|---|---|---|---|
| Subject 1 | 55.50 | 89.77 | 6 | 1.75 |
| Subject 2 | 110.20 | 132.50 | 4 | 7.0 |
| Subject 3 | 195.26 | 272.12 | 4 | 7.0 |
| Subject 4 | 124.56 | 126.62 | 4 | 7.0 |
| Subject 5 | 83.01 | 127.12 | 6 | 1.75 |
| Subject 6 | 66.04 | 83.89 | 7 | 1.75 |
| Subject 7 | 59.14 | 73.25 | 6 | 7.0 |
| Subject 8 | 97.11 | 114.00 | 8 | 1.75 |
| Subject 9 | 66.60 | 136.03 | 8 | 7.0 |
| Subject 10 | 38.25 | 92.34 | 12 | 7.0 |
| Subject 11 | 40.38 | 59.03 | 8 | 1.75 |
| Subject 12 | 28.68 | 90.09 | 4 | 1.75 |
| Subject 13 | 34.63 | 45.53 | 8 | 7.0 |
| Mean | 76.87 | 110.95 | | |
| Standard deviation | 46.3 | 56.2 | | |
| T test | P = 0.0003 | | | |

The inventors clearly demonstrate that the treatment with an extract according to the invention induces a statistically significant increase (p<0.001) in the expression of the K75 protein. It is interesting to note that this increase is observed in all patients regardless of the concentration tested or the duration of treatment carried out. Indeed, after 4 weeks of treatment, the increase in the expression of the K75 protein already seems very marked.

Example 3: Quantification of Protein Keratin 75 at the Level of the Scalp of a Patient with Bald Patch In this severe hair disorder, the expression of K75 is observed to be extremely low. The patient is treated with the same extract at a concentration of 7% and in the same way as in Example 2. The results obtained, namely the level of expression of the K75 protein (densitometric unit of the bands of Western blots) in the hair follicles of the patient suffering from bald patch, before and after treatment with an extract according to the invention, are presented in Table 5 below.

TABLE 5

| Subject | Duration of treatment (weeks) | Before treatment | After treatment |
|---|---|---|---|
| Subject 1 | 6 | 3.1 | 23.1 |

The inventors thus demonstrate that treatment comprising an extract according to the invention makes it possible to significantly increase the level of expression of K75 in a patient suffering from bald patch. It is interesting to note that at the end of the treatment, hair regrowth could be observed.

All of these results allow the inventors to highlight the benefit of an extract of *Silybum marianum* (L.) Gaertn. akenes comprising less than 0.2% by weight of silymarin to promote hair regrowth.

Example 4: Quantification of Keratin 75 at the Level of the Scalp on Bald Patches and Hair Regrowth In this severe hair disorder, the expression of K75 is found to be extremely low. Two patients suffering from bald patches are treated with the same extract at a concentration of 7% for 4 weeks and in the same way as in Example 2, over two or three bald patches. The results (5 bald patches in total) of K75 protein density and hair density are given in table 6 below.

TABLE 6

| | Untreated | | Treated with *Silybum marianum* extract | |
|---|---|---|---|---|
| Patches | K75 | Hair density (%) | K75 | Hair density (%) |
| 1 | 6.9 | 10 | 21.4 | 25 |
| 2 | 13.8 | 30 | 39.5 | 30 |
| 3 | 6.9 | 20 | 58.5 | 60 |
| 4 | 32.6 | 50 | 47.9 | 80 |
| 5 | 15.7 | 10 | 62.2 | 75 |
| Mean | 15.2 | 24.0 | 45.9 | 54.0 |
| SD | 4.7 | 7.5 | 7.3 | 11.3 |

The inventors thus clearly demonstrate that a treatment comprising an extract according to the invention makes it possible to significantly increase the level of expression of K75 in two patients suffering from bald patches. This increase is related to hair regrowth. In fact, hair density more than doubled after application of the extract according to the invention.

Local application of the extract according to the invention to the scalp thus made it possible to create conditions favourable to hair regrowth. The inventors therefore clearly demonstrate that such an extract may be useful to be applied to prevent a hair transplant or a medical treatment such as PRP or mesotherapy.

Example 5: Specific Effect of an Extract of *Silybum marianum* Akenes on the Phosphorylation of EGFR and PDGFRβ Receptors in the Dermal Papilla Cells The objective of this study is to show that an extract of *Silybum marianum* akenes tested at 30 µg/mL specifically induces phosphorylation of the tyrosine of receptors with tyrosine kinase activity (phospho-RTK) and kinases of the various signalling pathways (phosphokinases) contrary to Silymarin (Sigma) tested at 0.06 µg/mL. A control was treated with dimethylsulfoxide (DMSO), used as a solvent for the extract of *Silybum marianum* and Silymarin.

The study was carried out on dermal papilla cells, isolated from human hair follicles and cultured in a Petri dish for 48 hours. The dermal papilla cells were then stimulated for 1 hour in the presence of an extract of *Silybum marianum* or Silymarin. Total cellular lysates were then prepared and tested for the phosphorylation of various biological targets. Mapping of these targets was obtained with the aid of two antibody array kits which use a cellulose membrane on which antibodies are printed to detect the presence of proteins of interest (Proteome profiler human array kit, R&D Systems). The list of pharmacological targets screened in these tests is as follows and is available online:

49 phospho-receptors with tyrosine kinase activity (https://www.rndsystems.com/products/proteome-profiler-human-phospho-rtk-array-kit_ary001b)

43 signalling phosphokinases (https://www.rndsystems-.com/products/proteome-profiler-human phospho-kinase-array-kit_ary003b#product-datasheets).

The chemoluminescent signals were then detected using a densitometer (ChemiDoc, Biorad) and quantified with Image J 1.52 software using a Microarray profile plugin. Analysis of the data made it possible to determine the average intensity of pixels for each experimental condition and to measure a ratio relative to the DMSO control. Finally, the tests were carried out on two independent donors of dermal papilla cells and in duplicate. The photo-receptor results are presented in table 7 below.

TABLE 7

| Groups | Phospho EGFR | Phospho PDGFRβ |
|---|---|---|
| Ratio: Extract of *Silybum marianum*/Control | 1.91 | 2.77 |
| Ratio: Silymarin/Control | 1.02 | 0.76 |

These results show that the extract from *Silybum marianum* markedly increases the tyrosine phosphorylation of these two receptors by a ratio of 1.91 and 2.77 respectively as a response at one hour of treatment. On the other hand, the ratio remains close to 1, 1.02 and 0.76 for EGFR and PDGFRβ respectively, following incubation with Silymarin. These data show that the extract of *Silybum marianum* akenes at 30 µg/ml has as specific targets EGFR and PDGFRβ and that phosphorylation of these two receptors is not modulated by Silymarin at a concentration of 0.06 µg/ml.

In addition, the results of the screening of signalling phosphokinases are given in table 8 below which presents the induction of the phosphorylation of the tyrosine of signalling kinases by the extract of *Silybum marianum* akenes, the values being the *Silybum marianum* extract/Control ratio.

TABLE 8

| PDGFRβ | ERK 1/2 | GSK 3a/b | Akt 1/2/3 | STAT5a | STAT5a/b | b-catenin |
|---|---|---|---|---|---|---|
| 1.94 | 1.23 | 1.51 | 2.00 | 1.74 | 1.60 | 1.72 |

These experimental results make it possible to confirm that PDGFRβ is actually tyrosinated on the Y751 residue in response to the extract of *Silybum marianum* (ratio of 1.94). Moreover, this extract activates the known signalling pathways for EGFR and PDGFRβ, that is: ERK 1/2 (T202/Y204, T185/Y187); GSK3 a/b (S21/S9); Akt 1/2/3 (S473); STAT 5a (Y694); STAT 5a/b (Y694/Y699) and total b-catenin.

In conclusion, the set of results for this example demonstrates that the extract of *Silybum marianum* akenes specifically activates, and independently of the presence of Silymarin, the phosphorylation of EGFR and PDGFRβ tyrosine, as well as their signalling pathways in the dermal papilla cells.

The invention claimed is:

1. A method for promoting hair growth comprising administrating to a person in need thereof an effective amount of an extract of *Silybum marianum* (L.) Gaertn. akenes comprising less than 0.2% by weight of silymarin relative to the weight of dry extract, wherein the extract is obtained by:
   (a) extracting an oil from the akenes of *Silybum marianum* (L.) Gaertn.; and
   (b) extracting the oil obtained in step (a) with (i) an aqueous hydrotropic solution, or (ii) subcritical water or (iii) an organic solvent immiscible with the oil obtained in step (a).

2. The method according to claim 1, wherein the extract of *Silybum marianum* (L.) Gaertn. akenes comprises less than 0.1% by weight of silymarin relative to the weight of dry extract.

3. The method according to claim 1, wherein the extract of *Silybum marianum* (L.) Gaertn. akenes is administered in a topical manner.

4. The method according to claim 3, wherein the extract of *Silybum marianum* (L.) Gaertn. akenes is topically applied on an area of scalp devoid of hair.

5. The method of claim 1, wherein the method is for treating alopecia.

6. The method according to claim 5, wherein the alopecia is chosen from the group consisting of androgenetic alopecia, reactive alopecia, postmenopausal alopecia, alopecia areata, and cicatricial alopecia.

7. The method according to claim 5, wherein the alopecia is folliculitis.

8. The method according to claim 7, wherein the folliculitis is dissecting folliculitis.

9. The method according to claim 1, wherein the extract of *Silybum marianum* (L.) Gaertn. akenes is administered prior to or concomitantly with a hair transplant or a medical treatment of scalp.

10. The method according to claim 9, wherein the medical treatment of scalp is a treatment with platelet-rich plasma or a capillary mesotherapy.

11. A method for promoting hair growth comprising administrating to a person in need thereof an effective amount of a dermatological or cosmetic composition comprising an extract of *Silybum marianum* (L.) Gaertn. akenes comprising less than 0.2% by weight of silymarin relative to the weight of dry extract and a dermatologically or cosmetically acceptable excipient, wherein the extract is obtained by:
   (a) extracting an oil from the akenes of *Silybum marianum* (L.) Gaertn.; and
   (b) extracting the oil obtained in step (a) with (i) an aqueous hydrotropic solution, or (ii) subcritical water or (iii) an organic solvent immiscible with the oil obtained in step (a).

12. The method according to claim 11, wherein the extract of *Silybum marianum* (L.) Gaertn. akenes comprises less than 0.1% by weight of silymarin relative to the weight of dry extract.

13. The method according to claim 11, wherein the dermatological or cosmetic composition is administered in a topical manner.

14. The method according to claim 13, wherein the dermatological or cosmetic composition is topically applied on an area of scalp devoid of hair.

15. The method according to claim 11, wherein the dermatological or cosmetic composition comprises 0.01% to 15% by weight of the extract of *Silybum marianum* (L.)

Gaertn. akenes relative to the total weight of the dermatological or cosmetic composition.

16. The method of claim 11, wherein the method is for treating alopecia.

17. The method according to claim 16, wherein the alopecia is chosen from the group consisting of androgenetic alopecia, reactive alopecia, postmenopausal alopecia, alopecia areata, and cicatricial alopecia.

18. The method according to claim 16, wherein the alopecia is folliculitis.

19. The method according to claim 18, wherein the folliculitis is dissecting folliculitis.

20. The method according to claim 11, wherein the dermatological or cosmetic composition is administered prior to or concomitantly with a hair transplant or a medical treatment of scalp.

21. The method according to claim 20, wherein the medical treatment of scalp is a treatment with platelet-rich plasma or a capillary mesotherapy.

* * * * *